United States Patent [19]
Kamota

[11] Patent Number: 5,410,593
[45] Date of Patent: Apr. 25, 1995

[54] METHOD AND DEVICE FOR DISPLAYING A HOLD SERVICE ON MULTIFUNCTION TELEPHONE SET AND AN EXCHANGE

[75] Inventor: Satoru Kamota, Kawasaki, Japan
[73] Assignee: Fujitsu Limited, Kanagawa, Japan
[21] Appl. No.: 135,737
[22] Filed: Oct. 13, 1993
[30] Foreign Application Priority Data
Oct. 16, 1992 [JP] Japan .................. 4-278545
[51] Int. Cl.⁶ ............................. H04M 9/00
[52] U.S. Cl. .................. 379/393; 379/396; 379/164; 379/162; 379/163
[58] Field of Search ............ 379/393, 396, 164, 162, 379/163, 212, 156, 157

[56] References Cited

U.S. PATENT DOCUMENTS

| | | | |
|---|---|---|---|
| 4,133,985 | 1/1979 | Rasmussen et al. | 379/423 |
| 4,394,544 | 7/1983 | De Leon | 379/162 |
| 4,817,132 | 3/1989 | Chamberlin et al. | 379/162 |

FOREIGN PATENT DOCUMENTS

| | | | |
|---|---|---|---|
| 56-143748 | 11/1981 | Japan . | |
| 62-12242 | 1/1987 | Japan . | |
| 0104598 | 5/1988 | Japan | 379/162 |
| 0257793 | 10/1990 | Japan | 379/162 |
| 4000949 | 1/1992 | Japan | 379/393 |

*Primary Examiner*—James L. Dwyer
*Assistant Examiner*—Jacques M. Saint-Surin

[57] ABSTRACT

A hold displaying system includes plural multifunction telephone sets each of which has a hold indicator, and an exchange for accommodating the telephone sets. Each multifunction telephone set cooperates with the exchange to perform a hold display on the hold indicator of the respective multifunction telephone set. When information for a multifunction telephone set to which a hold display is forwarded is sent from a multifunction telephone set on a hold operating side to the exchange, the exchange transmits its hold display switching information to the multifunction telephone set to which the hold display was forwarded, whereby the hold indicator indicates the same hold display as that provided by the multifunction telephone set to which a hold display has been forwarded during its holding operation.

22 Claims, 7 Drawing Sheets

FIG. 7 (a)

| CONTROL MEMORY | HOLDING STATE CONTROL | EXTENSION LINE OF CHANGING POINT IN HOLDING STATE |
|---|---|---|

FIG. 7 (b)

| DATA ITEMS | CONTENTS | REMARKS |
|---|---|---|
| SPEECH PATH DATA | OFFICE LINE DATA<br>TRANSIT LINE DATA<br>EXTENSION LINE DATA | |
| EXTENSION DATA OF HOLD DISPLAY CHANGING POINT | EXTENSION LINE DATA | NEW HOLDING POINT DATA |
| HOLDING POINT DATA | EXTENSION LINE DATA | COMPLETELY IDLED STATE |

FIG. 7 (c)

| EXTENSION STATUS SUPERVISORY MEMORY | IDLE EXTENSION LINE/CALLING SUPERVISORY |
|---|---|

FIG. 8 (a)

| CONTROL MEMORY | EXTENSION LINE OF HOLDING POINT IN HOLD STATE |
|---|---|

FIG. 8 (b)

| DATA ITEMS | CONTENTS |
|---|---|
| SPEECH PATH DATA | OFFICE LINE DATA<br>TRANSIT LINE DATA<br>EXTENSION LINE DATA |
| HOLDING POINT DATA | EXTENSION LINE DATA |

METHOD AND DEVICE FOR DISPLAYING A HOLD SERVICE ON MULTIFUNCTION TELEPHONE SET AND AN EXCHANGE

BACKGROUND OF THE INVENTION

1) Field of the Invention

The present invention relates to a method and device for displaying a hold service on a multifunction telephone.

2) Description of the Related Art

Recently, with the progress in technology of small and middle size private branch exchanges, an increasing number of offices has introduced PBXs and button telephone sets. Particularly, multifunction telephone sets have been often used where a call is held during conversation by depressing the hold button thereof and then can be transferred to the right responder even if unrelated person receives the telephone. Button holding, which is set at an office line button attribution, has been increasingly used for a call forwarding.

In the conventional multifunction telephone set hold service system, the multifunction telephone set indicates its holding state by flashing a lamp. Some multifunction telephone sets can perform the button holding with their office line buttons attributed.

In this case, plural office line buttons can be attributed to a single multifunction telephone set, or a single office line button can be attributed to plural telephone sets. When the button holding is employed, a self point holding state and a distant point holding state can be distinguished from each other by the flashing displays with different colors.

However, such a conventional multifunction telephone set hold service displaying system has a disadvantage in that when an addressed person's job does not allow an immediate respond to the telephone call, the hold operator must maintain its call forwarding operation till the addressed person becomes free, whereby the operator's job is disturbed.

Moreover, since only the multifunction telephone set of a hold operator flashes in green during the self hold state, the flashing cannot be seen on other multifunction telephone sets. Hence there has been a disadvantage in that the hold operator must wait till the addressed person takes the telephone call.

When a transfer or forwarding is made by holding an office line button, plural office line buttons can be attributed to a single multifunction telephone set, but a common office line button can be attributed to plural multifunction telephone sets. In this case, plural button holding calls may occur. If all other distant points display a hold state, the corresponding button hold calling cannot be specified. Hence there is a disadvantage in that it takes much time for the responder to respond to the holding.

Furthermore, there is a disadvantage in that the hold operator tells about the corresponding button and the responder must depress correctly the button to respond to the call. When the responder cannot respond quickly to a call or the responder to the button holding call does not know the button holding call to be responded, he must ask for the right button again to the hold operator or watch the color of the button lamp of the multifunction telephone set subjected to the hold operation to confirm the right button.

There is a disadvantage in that when the hold operator is out of the spot, the responder must confirm the color of the right button lamp at the multifunction telephone set subjected to the hold operation.

SUMMARY OF THE INVENTION

The present invention is made to overcome the above mentioned problems. An object of the present invention is to provide a hold service displaying system for a multifunction telephone set which can respond quickly to a holding call, thus providing an improved response to customers.

In order to achieve the above objects, according to the present invention, the method for displaying a hold service on a multifunction telephone set comprises the steps of preparing a plurality of multifunction telephone sets each which has a hold indicator, and an exchange accommodating the plurality of multifunction telephone sets, whereby when a holding operation of a multifunction telephone set is made during a call, the plurality of multifunction telephone sets and the exchange are cooperated with each other so as to provide a hold indication to the hold indicators of the multifunction telephone sets; performing a holding operation of a multifunction telephone set on a hold operating side to send information for multifunction telephone sets on a holding operation side from a multifunction telephone set to which a call holding display is forwarded to the exchange; and sending the hold display switching information from the exchange to the multifunction telephone set to which the hold display is forwarded, whereby the hold indicator of the multifunction telephone set to which the hold display is forwarded indicates a hold display similar to that made by the multifunction telephone sets to which the hold display is forwarded.

According to the present invention, the method for displaying a hold service for a multifunction telephone set further comprises the steps of performing a hold operation of said multifunction telephone set to which a holding operation is made to send information for a forwarded multifunction telephone set from the multifunction telephone set on the hold operating side to the exchange; judging a status of the multifunction telephone set to which a hold display is forwarded within the exchange; and sending the hold display switching information with respect to the forwarded multifunction telephone set by means of the exchange when the multifunction telephone set to which a hold display is forwarded is in an idle state, whereby a hold display similar to that made by the multifunction telephone set to which a hold display is forwarded is executed by the hold indicator of the multifunction telephone set to which the hold display is forwarded.

Furthermore, in the hold service displaying method according to the present invention, when the multifunction telephone set on hold operating side receives an extension call and the multifunction telephone set to which a hold indication is forwarded is in an idle state, the multifunction telephone set to which the hold indication is forwarded indicates its holding display while the multifunction telephone set on the hold operating side erases its holding display.

In the hold service displaying method according to the present invention, when said multifunction telephone set on hold operating side receives an office line call and the multifunction telephone set to which a hold display is forwarded is in an idle state, the multifunction telephone set to which the hold display is forwarded displays its holding state while it displays information that other multifunction telephone sets are in holding state, to the multifunction telephone set on the hold operating side.

Furthermore, in the hold service displaying method according to the present invention, the multifunction telephone set on the hold operating side displays its hold operating state in a different color from that of the hold display of the multifunction telephone set to which a hold display is forwarded.

The hold service displaying method according to the present invention further comprises the steps of providing a holding operation of the multifunction telephone set to which a holding operation is made; sending information for a multifunction telephone set to which a hold display is forwarded from the multifunction telephone set on the holding operation side to the exchange; judging a status of the multifunction telephone set to which a hold display is forwarded within the exchange; and sending the hold display information with respect to the multifunction telephone set on the hold operating side by means of the exchange when the multifunction telephone set to which a hold display is forwarded is in a busy or hold state, whereby a hold display is made on the hold indicator of the multifunction telephone set on the hold operating side.

Furthermore, the hold service displaying method according to the present invention further comprises the steps of sending hold display information and distant blocking information with respect to the multifunction telephone set on the hold operating side by means of the exchange when the multifunction telephone set to which a hold display is forwarded is in a busy or hold state, to perform a hold display on the hold indicator of the multifunction telephone set on said hold operating side; and displaying the distant blocking information on the indicator of the multifunction telephone set on the hold operating side.

The hold service displaying method according to the present invention further comprises the step of inputting a special number as well as a telephone number of the multifunction telephone set to which a hold display is forwarded by means of the multifunction telephone set on the hold operating side when a hold display is performed on the multifunction telephone set to which the hold display is forwarded.

The hold service displaying method according to the present invention further comprises the step of inputting a telephone number of the multifunction telephone set to which a hold display is forwarded by means of the multifunction telephone set on the hold operating side when a hold display is made on the multifunction telephone set to which the hold display is forwarded, in addition to an operation of a function button.

In the hold service displaying method according to the present invention, the information for the multifunction telephone set to which a hold display is forwarded is information on a telephone number of the multifunction telephone set to which a hold display is forwarded.

According to a present invention, the hold service displaying device suitable for a multifunction telephone set comprises plural mutifunction telephone sets and an exchange accommodating the plural multifunction telephone sets, whereby the exchange and the plural multifunction telephone sets cooperate with each other so as to provide a hold display on a hold indicator of each of the mutifunction telephone set by executing a call holding operation during a calling period, first memory means for storing the exchange line information that a multifunction telephone set on hold operating side has used; second memory means for storing information sent from the multifunction telephone set on the hold operation side, the information being used for the multifunction telephone set to which a hold display is forwarded; supervisory means for supervising the status of a currently used line; and control means for instructing a hold display switching information to the multifunction telephone set to which the hold indication is forwarded when information for the multifunction telephone set to which a hold display is forwarded is sent from the multifunction telephone set on the hold operating side while the information contents of the first and second memory means are referred with a supervisory result from the supervisory means, the hold display switching information being information that the hold indicator of the multifunction telephone set to which a hold display is forwarded provides a hold display similar to that obtained according to a hold operation of the multifunction telephone set to which a hold display is forwarded.

Therefore, the present invention has the following effects and advantages:

(1) The multifunction telephone set of a responder can indicate a hold display forwarded from a multifunction telephone set as it performs its hold operation. Hence a quick response to a hold call can be made without disturbing other person's job, thus leading to an improved response to customers.

(2) Moreover there is an advantage in that since the state of the multifunction telephone set to which a hold display is forwarded is recognized, a call hold operator can process in accordance with the state of a forwarded point, thus knowing the state of the forwarded point in more detail.

(3) When a hold display is made on the multifunction telephone set to which a hold display is forwarded, the multifunction telephone set of the hold operator inputs a special number and a telephone number of the multifunction telephone set to which the hold display is forwarded. Hence the hold display forwarding operation can be performed simply.

(4) When a hold display is made on a multifunction telephone set to which a hold display is forwarded, a function button is operated while the multifunction telephone set on a hold operating side inputs a telephone number of a multifunction telephone set to which a hold display is forwarded. Thus the multifunction telephone set is structurally simplified and a hold display transfer process is performed without changing largely the conventional networks.

BRIEF DESCRIPTION OF THE DRAWINGS

FIGS. 7(a) to 7(c) are a diagram explaining data configuration at a holding operation time according to an embodiment of the present invention, respectively.

FIGS. 8(a) and 8(b) are a diagram explaining conventional data configuration at a holding operation time, respectively.

DESCRIPTION OF THE PREFERRED EMBODIMENTS

Referring to the attached drawings, an explanation will be made in detail as for preferred embodiments of the hold service displaying system suitable for a multifunction telephone set according to the present invention.

Figure 1:
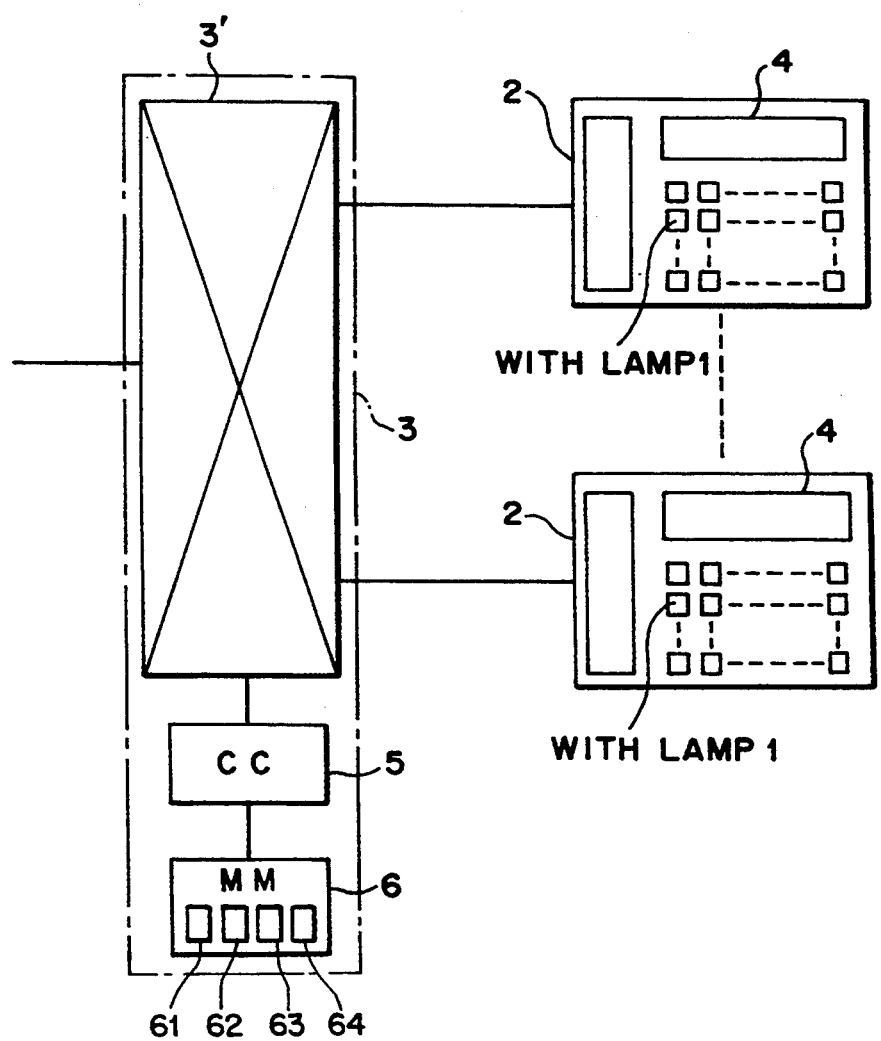
FIG. 1 is a block diagram showing the principle of the present invention.

(a) Explanation of the principle of the invention:

FIG. 1 is a block diagram showing the principle of the present invention. In FIG. 1, numeral 3 represents an exchange. The exchange 3 accommodates plural multifunction telephone sets 2. The exchange 3 also includes a speech path switch 3', a main control device 5, and a main memory device 6. The multifunction telephone sets 2 have each a hold indicator 1.

The multifunction telephone sets 2 and the exchange 3 cooperate with each other so that the hold indicators 1 of other multifunction telephone sets 2 provide respectively a hold display when a call hold operation is performed to a certain multifunction telephone set 2 during a calling time.

The multifunction telephone set 2 has the following functions:

(1) Information for the multifunction telephone set 2 to which a hold display is forwarded is sent to the exchange 3, in addition to a hold operation at a hold operation time.

(2) When another multifunction telephone set 2 in a calling state is one subjected to a call hold operation, if the hold display switching information is sent from the exchange 3, a hold display similar to that executed by the multifunction telephone set appears on the hold indicator 1 thereof.

(3) When a multifunction telephone set 2 on a hold operation side receives hold display information from the exchange 3, its hold indicator 1 performs the hold display.

(4) When a multifunction telephone set 2 receives hold display information and distant point blocking information from the exchange 3 at a hold operation time, its hold indicator 1 displays the hold display while its indicator 4 displays information that the distant point is in blocking state.

(5) When a multifunction telephone set 2 receives a special number and a telephone number of a multifunction telephone set 2 to which a hold display is forwarded at a hold operating time, it enables the hold display on the multifunction telephone set 2 to which the hold display is forwarded.

(6) When the multifunction telephone set 2 receives a telephone number of a multifunction telephone set 2 to which a hold display is forwarded at a hold operating time, in addition to an operation of a function button 1', the multifunction telephone set 2 to which a hold indication is forwarded provides a hold display.

The exchange 3 includes the first memory means 61 for storing line information used by the multifunction telephone set 2 to which a hold display is forwarded, the second memory means 62 for storing information for a multifunction telephone set 2 to which a hold display is forwarded sent from the multifunction telephone set 2 on a hold operating side, the supervisory means 63 for supervising the state of a currently used line, and control means 64 for instructing a hold display switching information to the multifunction telephone set 2 to which a hold display is transferred when information for the multifunction telephone set 2 to which a hold display is forwarded is sent from the multifunction telephone set 2 on a hold operating side while the memory contents of the first and second memory means 61 and 2 are referred with the supervisory result from the supervisory means 63. The hold display switching information is used to execute a hold display similar to that performed by the multifunction telephone set 2 to which a hold display is forwarded, using the hold indicator 1 of the multifunction telephone set 2 to which a hold display is forwarded.

Thus when the exchange 3 receives information for multifunction telephone set 2 to which a hold display is forwarded from the multifunction telephone set 2 on a hold operating side, a hold display switching information can be sent with respect to the multifunction telephone set 2 to which a hold display is forwarded.

The further detail description is as follows:

(1) the exchange 3 judges the state of the multifunction telephone set 2 to which a hold display is forwarded when it receives information for the multifunction telephone set 2 to which a hold display is forwarded from the multifunction telephone set 2 on a hold operating side.

(2) If the multifunction telephone set 2 to which a hold display is forwarded is judged to be an idle state, the exchange 3 sends a hold indication switching information with respect to the multifunction telephone set 2 to which a hold display is forwarded.

In this case, when the multifunction telephone set 2 on a hold display side receives an extension line call and the multifunction telephone set 2 to which a hold display is forwarded is in an idle state, the multifunction telephone set 2 to which a hold display is forwarded displays its hold state while the hold display of the multifunction telephone set 2 on the hold operating side is erased.

When the multifunction telephone set 2 on the hold operating side receives an office line call and the multifunction telephone side to which a hold display is forwarded is in an idle state, the multifunction telephone side to which a hold display is forwarded displays its hold state while the multifunction telephone set 2 on a hold operating side displays that other multifunction telephone sets are in a hold state.

In this case, the multifunction telephone set 2 on a hold operating side has a different color from that of the hold display of the multifunction telephone set 2 to which a hold display is forwarded.

(3) If it is judged that the multifunction telephone set 2 to which a hold display is forwarded is in a call or in a hold state, the exchange 3 sends hold display information with respect to the multifunction telephone set 2 on a hold operating side. In other words, if the multifunction telephone set 2 to which a hold display is forwarded is in a call state or in a hold state, the exchange 3 sends hold display information and distant point blocking information with respect to the multifunction telephone set 2 on the hold operation side.

Therefore according to the present invention, the multifunction telephone set 2 and the exchange 3 cooperate with each other so that the hold indicator 1 of each multifunction telephone set 2 provides a hold display by performing a call hold operation to the multifunction telephone set 2 during a calling state.

Figure 2:
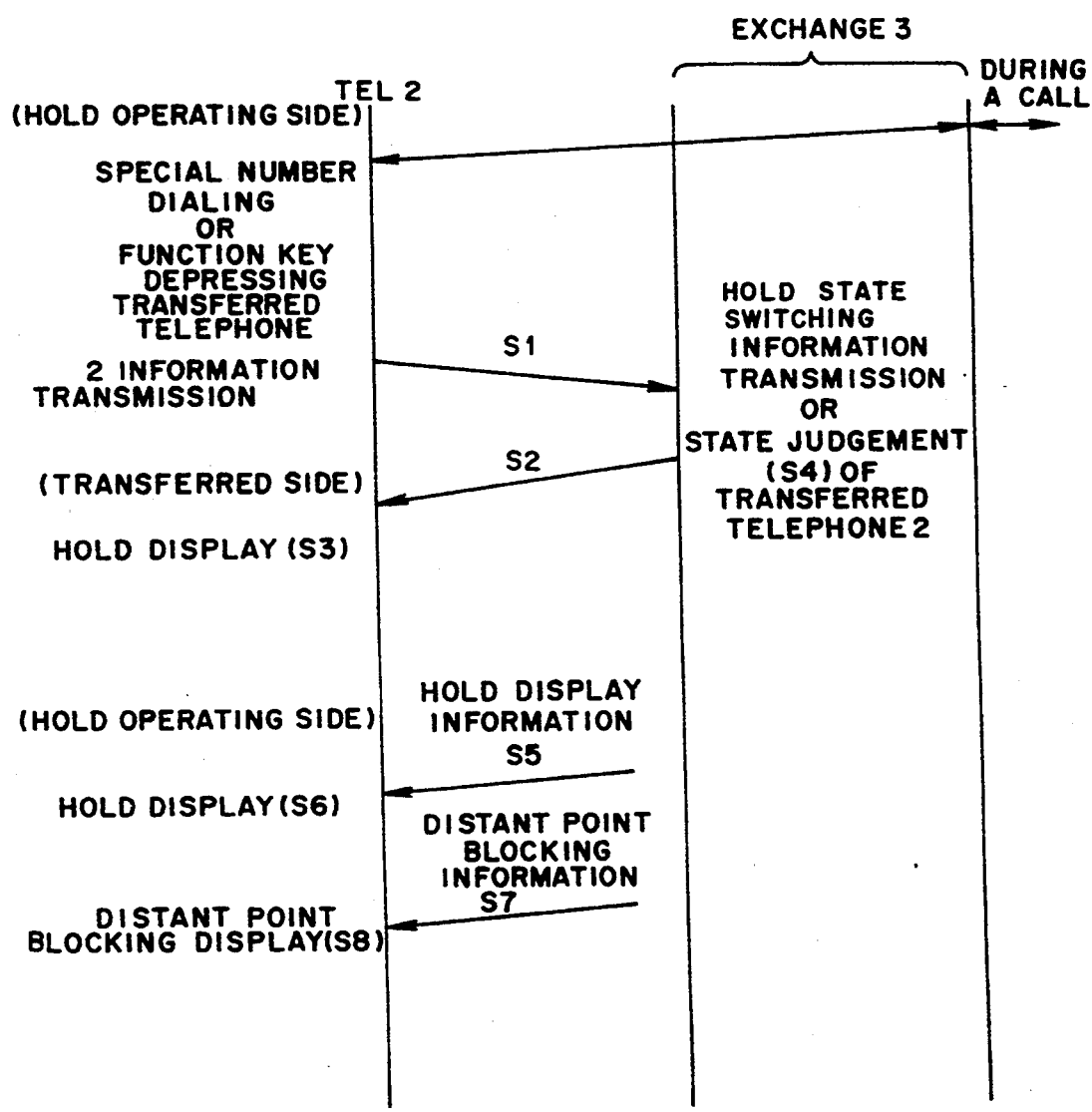
FIG. 2 is a time chart showing the function of the present invention.

As shown by the time chart in FIG. 2, information for multifunction telephone set 2 to which a hold display is forwarded is sent from the multifunction telephone set 2 on a hold operating side to the exchange 3, while the multifunction telephone set 2 on the hold operating side performs a hold operation (step S1 in FIG. 2).

That is, when the multifunction telephone set 2 to which a hold display is forwarded provides a hold display, the multifunction telephone set 2 on the hold operating side inputs a special number and a telephone number of the multifunction telephone set 2 to which a hold display is forwarded.

In other words, when a hold display is performed by the multifunction telephone set 2 to which a hold display is forwarded, a telephone number of the multifunction telephone set 2 to which a hold display is forwarded is inputted in addition to an operation of the function button 1'.

Then the exchange 3 transmits hold display switching information to the multifunction telephone set 2 to which a hold display is forwarded (step S2 in FIG. 2). Thus a hold display similar to that obtained by the hold operation of a multifunction telephone set 2 to which a hold display is forwarded is performed by the hold indicator 1 of the multifunction telephone set 2 to which a hold display is forwarded (step S3 in FIG. 2).

In addition to a hold operation of the multifunction telephone set 2 on a hold operating side, when information for the multifunction telephone set 2 on a hold operating side is sent from the multifunction telephone set 2 on a hold operating side to the exchange 3 (step S1 in FIG. 2), the exchange 3 judges the state of the multifunction telephone 2 to which a hold display is forwarded (step S4 in FIG. 2).

As a result, if the multifunction telephone set 2 to which a hold display is forwarded is in an idle state, the exchange 3 transmits hold indication switching information with respect to multifunction telephone set 2 to which a hold display is forwarded (step S2 in FIG. 2).

A hold display similar to that indicated on the multifunction telephone set 2 to which a hold display is forwarded is displayed on the hold indicator 1 of the multifunction telephone set 2 to which a hold display is forwarded (step S3 in FIG. 2).

In this case, when the multifuncion telephone set 2 on the hold operating side receives an extension call, the multifunction telephone set 2 to which a hold display is forwarded displays its hold state while the hold display of the multifunction telephone set 2 on the hold operating side is erased.

When the multifuncion telephone set 2 on the hold operating side receives an office line call, the multifunction telephone set 2 to which a hold display is forwarded displays its hold state while the hold display of the multifunction telephone set 2 on the hold operating side displays that other multifunction telephone sets 2 are in a hold state. Then the multifunction telephone set 2 on the hold operating side displays a hold indication in a different color from that of the hold display of the multifunction telephone set 2 to which a hold display is forwarded.

When the multifunction telephone set 2 to which a hold display is forwarded is in a call or hold state, the exchange 3 transmits hold display information with respect to the multifunction telephone set 2 on the hold operating side (step S5 in FIG. 2). Thus a hold display is provided on the hold indicator 1 of the multifunction telephone set 2 on the hold operating side (step S6 in FIG. 2).

In other words, when the multifunction telephone set 2 to which a hold display is forwarded is in a call or hold state, the exchange 3 transmits hold display information and distant point blocking information with respect to the multifunction telephone set 2 on the hold operating side (steps S5 and S7 in FIG. 2).

As a result, the hold indicator 1 of the multifunction telephone set 2 on the hold operating side provides a hold display (step S6 in FIG. 2) while the indicator 4 of the multifunction telephone set 2 on the hold operating side provides a distant point blocking display (step S8 in FIG. 2).

According to the present invention, the following advantages and features can be obtained:

(1) A call display can be made to the multifunction telephone set of the right responder to the call display during a hold state. Moreover, since the multifunction telephone set of the corresponding person can be conditioned in the similar holding state, a response to the holding call can be made quickly without disturbing other person's job, thus improving the telephone courtesy to customers.

(2) Moreover since the state of the multifunction telephone set 2 to which a hold display is forwarded can be recognized, a hold operator can process according to the state of the distant point to be forwarded and can advantageously notify the state of a forwarded distant point with more detail information.

(3) When a hold display is made on the multifunction telephone set 2 to which a hold display is forwarded, the multifunction telephone set 2 on the hold operating side inputs a special number and a telephone number of the multifunction telephone set to which a hold display is forwarded, whereby the hold display forwarding procedure can be executed readily.

(4) When a hold display is made on the multifunction telephone set 2 to which a hold display is forwarded, the multifunction telephone set 2 on the hold operating side inputs the telephone number of the multifunction telephone set 2 to which a hold display is transferred in addition to an operation of the function button, thus simplifying the structure of the multifunction telephone set. Thus a hold display forwarding can be processed without changing largely the conventional networks.

Figure 3:
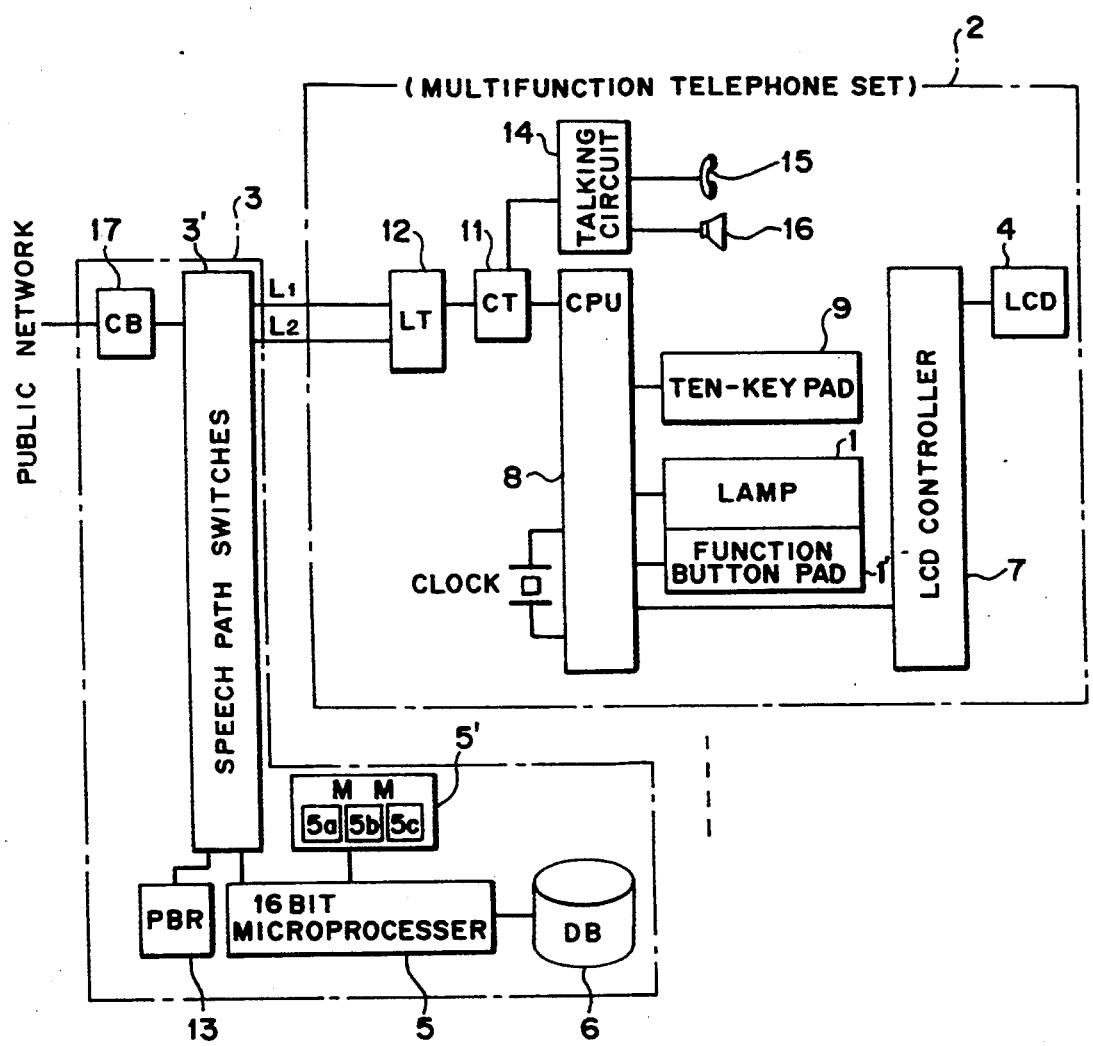
FIG. 3 is a block diagram showing in detail an exchange and a multifunction telephone according to an embodiment of the present invention.

(b) Explanation of an Embodiment of the Present Invention:

FIG. 3 is a block diagram showing an embodiment according to the present invention. In FIG. 3, numeral 3 represents an exchange. The exchange 3 accommodates plural multifunction telephone sets 2. In the network, when a multufunction telephone set 2 is set to a call holding during a call state, it cooperates with the exchange 3 so that the hold display is provided on the hold indicators 1 of other multifunction telephone sets 2.

In the network, when a multufunction telephone set 2 is set to a call holding during a call state, it cooperates with the exchange 3 so that the hold display can be transferred to a specific multifunction telephone set 2 to display it on the hold indicators 1 thereof.

The exchange 3 is constituted of a speech path switch 3', a 16-bit microprocessor (main control unit) 5, a main memory (MM) 5', a database (main memory unit) 6, a PB signal analyzer (PBR) 13, and a trunk (CB) 17.

The speech path switch 3' transmits a signal from the trunk 17 to a predetermined multifunction telephone set 2 and the trunk 17 acts as an interface between the speech path switch 3' and the public network.

The PB signal analyzer 13 receives a PB (push button) signal to analyze its number. The database 6 acts as a memory storing data regarding communication lines and the extension numbers of the points to be changed in the hold display.

The 16-bit microprocessor 5 controls the speech path switch 3' and allows the speech path switch 3' to connect between the self office terminal and another office terminal to perform a normal switching process. Furthermore, the 16-bit microprocessor 5 operates as follows:

The 16-microprocessor 5 also controls in such a manner that the exchange 3 cooperates with the multifunction telephone sets 2 in the exchange 3 and the hold display is outputted on the hold indicator 1 of another multifunction telephone set 2 when a certain multifunction telephone set 2 is held during a call state.

Furthermore, when the 16-bit microprocessor 5 receives hold display changing (transfer) information and telephone number information of a distant multifunction telephone set from a multifunction telephone set 2 on a hold operating side, it transmits hold display switching information to the distant multifunction telephone set 2.

In a detail description, the 16-bit microprocessor 5 functions as follows:

(1) When the microprocessor 5 receives telephone number information on a multifunction telephone set 2 to be changed in display and hold display change (transfer) information from the multifunction telephone set 2 on the hold receiving side, it judges the state of the multifunction telephone set 2 subjected to the hold display change.

(2) When the judged result indicates that the multifunction telephone 2 set to which a hold display is forwarded is in an idle state, the hold display switching information is transferred to the multifunction telephone 2.

(3) When the judged result indicates that the multifunction telephone set 2 to which a hold display is forwarded indicates is busy or in a hold state, hold display information is sent to the multifunction telephone set 2 on a hold operating side. In more detail, when the multifunction telephone set 2 to which a hold display is forwarded is busy or in a hold state, hold display information and distant point blocking information are transferred to the multifunction telephone set 2 on the hold operating side.

That is, when the multifunction telephone set 2 to which the hold display is changed is in use (or busy) or in a hold state, a change notification signal as well as a signal for indicating the state similar to that of the depressed button are transferred to the multifunction telephone set 2 which has been changed in its hold indication. With the operation, it is commanded to produce an alarm tone from the speaker 16 of the multifunction telephone set 2.

The main memory 5' stores a program to operate the 16-bit microprocessor 5. The main memory 5' also stores temporarily data used for the 16-bit microprocessor 5 in the communication process.

Furthermore, in order to provide the 16-bit microprocessor 5 with a hold display changing function, the main memory 5' includes a control memory 5a, a talking circuit/hold display changing number memory 5b, and a supervisory memory 5c.

That is, the control memory 5a stores a program for changing the hold display of a distant point which is performed by the 16-bit microprocessor 5. According to the program, the 16-bit microprocessor 5 operates to hold an extension line to be changed or an office line to be changed, as described above.

The talking circuit/hold display changing number memory 5b stores automatically the line used by the multifunction telephone set 2 which has been held and the extension or office line number dialed to change the hold display. The supervisory memory 5c supervises the status in use of the extension or office line currently used.

Data configuration at holding operation time of each of the memories 5a to 5c is shown in FIGS. 7(a) to 7(c). In comparison, FIGS. 8(a) and 8(b) show conventional data configuration at a normal holding operation time. The database 6 may function instead of the memories 5a to 5c.

Figure 4:
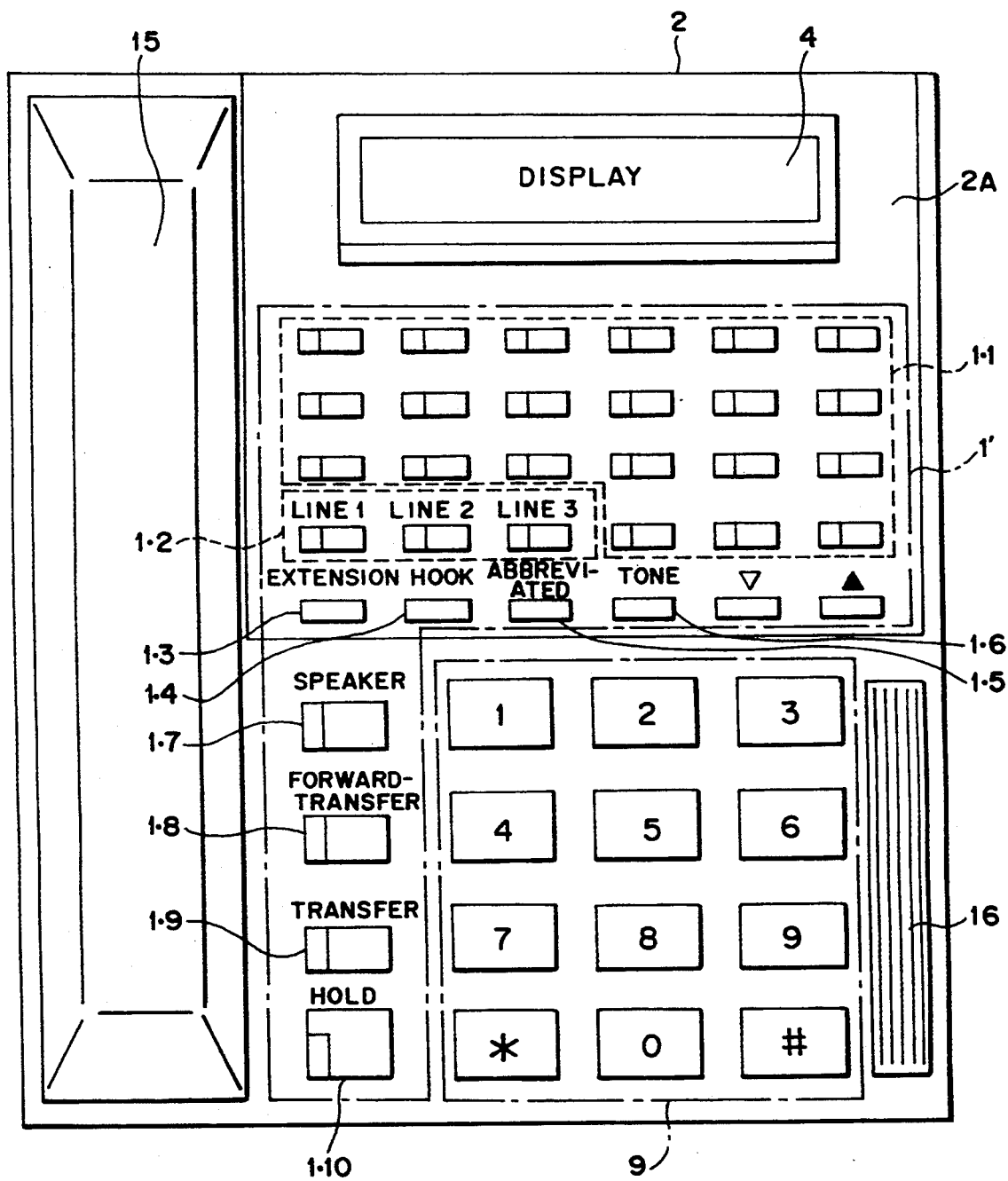
FIG. 4 is an external appearance view showing a multifunction telephone according to an embodiment of the present invention.

The multifunction telephone set 2 has a handset 15 and a telephone set body 2A, as seen from the appearance shown in FIG. 4. The telephone set body 2A includes a ten-key pad 9, a function button 1', a display 4, and a speaker 16.

The multifunction telephone set 2 also includes internally a main control unit (CPU) 8, a lamp (or a hold indicator and a light emitting element such as light emitting diode) 1, a multiplexer unit (CT) 11, a terminal unit (LT) 12, a talking circuit 14, and a display (LCD) controller 7 as shown in FIG. 3 (not seen in FIG. 4).

The ten-key pad 9 is formed of keys numbered "0" through "9", and a * key, and a # key. These keys are used to dial an external telephone number, an extension telephone number, and the like.

The function button pad 1' is formed of an abbreviated registration button 1.1, a line selection button 1.2, an extension button 1.3, a hook button 1.4, an abbreviated button 1.5, a tone button 1.6, a speaker button 1.7, a recall button 1.8, a transfer button 1.9, and a hold button 1.10. A lamp 1 is respectively housed in the line selection button 1.2, the speaker button 1.7, the recall button 1.8, the transfer button 1.9, and the holding button 1.10.

In addition to the conventional functions, the function button pad 1' and the ten-key pad 9 are used to indicate the hold display transfer to the telephone set body and the exchange 3 during a call. That is, a hold display can be indicated by means of special information such as a proper combination of the hook button 1.4 (or transfer button 1.9) and a numerical key.

Furthermore, a proper combination of a numerical key and the hook button 1.4 (or transfer button 1.9) plus one of abbreviated registration keys 1.1 of the function button pad 1' can be registered.

Thus depressing the abbreviated registration button 1.1 during a call enables similarly the operation obtained by depressing the proper combination of a numerical key and the hook button 1.4 (or transfer button 1.9).

Two pairs of a red lamp 1 and a green lamp 1 are housed respectively in the line selection (office line) buttons 1.2, the extension button 1.3, and the hold button 1.10. Lamps 1 in the line selection button 1.2 and the extension button 1.3 flash in green display when it receives a hold operation while a multifunction telephone set 2 receives a hold display changing operation from another telephone set. The office line of the function button pad 1' and the extension button 1.3 perform a button holding (holding indication).

When a self multifunction telephone set 2 processes a hold display change to another telephone set, the lamp 1 of the office line button flashes in red. Then the office line button of the function button pad 1' is used to display that the hold display has been transferred to the multifunction telephone set 2 to which a hold display is forwarded.

Furthermore when the self multifunction telephone set 2 performs a hold display changing process to transfer the hold display to another telephone set, the extension button 1.3 of the function button 1' flashes in green.

The speaker 16 produces sound such as a calling tone. The display 4 is operated in accordance with signals from the display controller 7 to display a predetermined characters and image such as a distant point blocking display.

The display controller 7 operates the display 4 in accordance with the control signal from the main control unit 8 and displays a character and image instructed by the main control unit 8 on the display.

The main control unit 8 outputs a proper control signal to each unit of the multifunction telephone set 2 and the self exchange 3, based on information from the exchange 3, the function button pad 1' and the ten-key pad 9. Namely, the main control unit 8 controls each unit of the multifunction telephone set 2 to allow the multifunction telephone set 2 to call another terminal, thus notifying the exchange 3 of proper information.

The main control unit 8 further executes the following process: That is, the main control unit 8 controls so as to cooperate the self multifunction telephone set 2 with the intra-office exchange 3. When a call of a multifunction telephone set (self telephone set 2 or another telephone set 2) 2 is held, the lamp 1 of a predetermined button of another multifunction telephone set (another telephone 2 or self telephone 2) 2 is subjected to a hold display.

Furthermore, the main control unit 8 provides the following functions:

(1) When receiving hold display changing (transfer) information to the multifunction telephone set 2 from the function button 1' and the ten-key pad 9 in addition to the hold operation of the self multifunction telephone set 2, the main control unit 8 sends the telephone number information and the hold display switching information to the exchange 3.

(2) When receiving both hold display changing information and hold display switching information from the exchange 3 (or when a call during conversation of another multifunction telephone set 2 is made to forward to the self multifunction telephone set 2), the main control unit 8 allows its hold indicator 1 to provide the hold display similar to that held by the main control unit 8 itself.

That is, when receiving each information described above, the main control unit 8 flashes in green the office button of the self multifunction telephone set 2, if the holding operation is made for a call on the extension button side or for a button holding by the office line button.

(3) When the main control unit 8 has its multifunction telephone set 2 on the hold operation side and receives hold display information from the exchange 3, it makes the display 4 of its multifunction telephone set 2 to execute the hold display.

This corresponds to that the hold button of the self multifunction telephone set 2 is in a depressed state. Thus the control unit 8 instructs that the speaker 16 produces an alarm tone.

(4) When the main control unit 8 has its multifunction telephone set 2 at a hold operation time and receives hold indication information and distant point blocking information from the exchange 3, it makes its display 4 to execute the hold display and the transfer blocking information.

This corresponds to that the hold button of the self multifunction telephone set 2 is in a depressed state. The main control unit 8 instruct the speaker 16 to produce an alarm tone.

(5) When the extension button is in a call state and the multifunction telephone set 2 is subjected to a hold operation, while a special number and a hold display changing extension number are dialed, the main control unit 8 transmits the changing information and hold display changing signal to the exchange 3.

When the main control unit 8 transmits the changing information and the hold display changing signal to the exchange 3, the lamp indication of the extension button of the self multifunction telephone set 2 is dimmed.

When the office line button is made in a hold state and the special number and the hold indication forwarding number are dialed, the main control unit 8 also transmits the changing information and the hold display changing signal to the exchange 3.

When the office line button is held and the changing information and the hold display changing signal are sent to the exchange 3, the main control unit 8 flashes in red the office line button of the self multifunction telephone set 2.

(6) When the self multifunction telephone set 2 is in a hold operation and dialing for the multifunction telephone set 2 to which a hold display is forwarded is inputted using the ten-key pad 9 in addition to the operation of the function button 1', the main control unit 8 transmits the forwarding telephone number information and the hold display changing signal to the exchange 3.

The multiplexer 11 shown in FIG. 3 executes signal multiplexing including bits and frame synchronization. The terminal device 12 performs a signal conversion at the terminal of a subscriber line terminal. Both the multiplexer 11 and the terminal device 12 are integrally formed as an LSI.

In the above structure, when a call hold operation is executed to the multifunction telephone set 2 during conversation, the multifunction telephone set 2 cooperates with the exchange 3 so that a hold display is provided on the hold indicator 1 of each multifunction telephone set 2.

Figure 5:
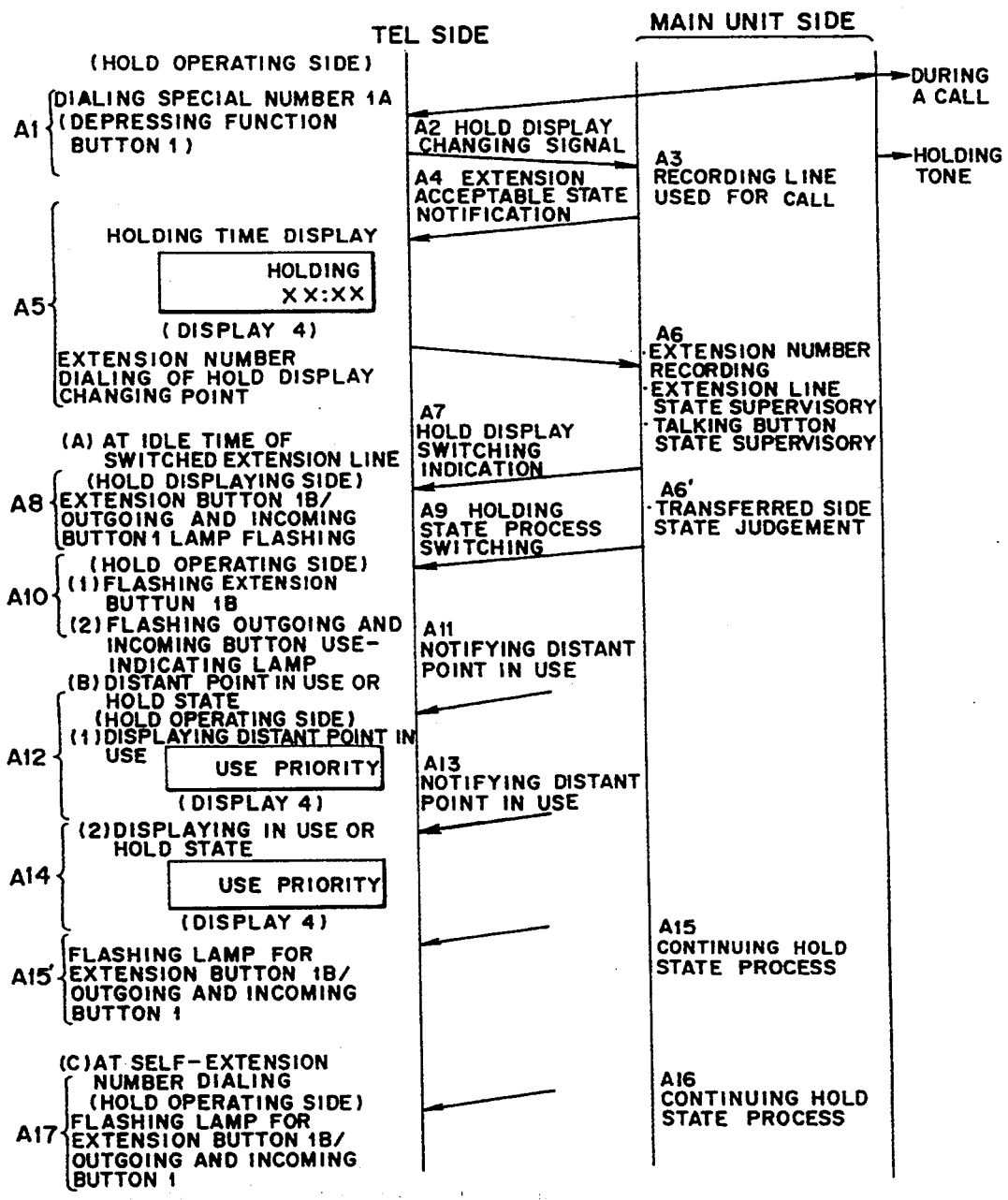
FIG. 5 is a time chart explaining the function of an embodiment of the present invention.
Figure 6:
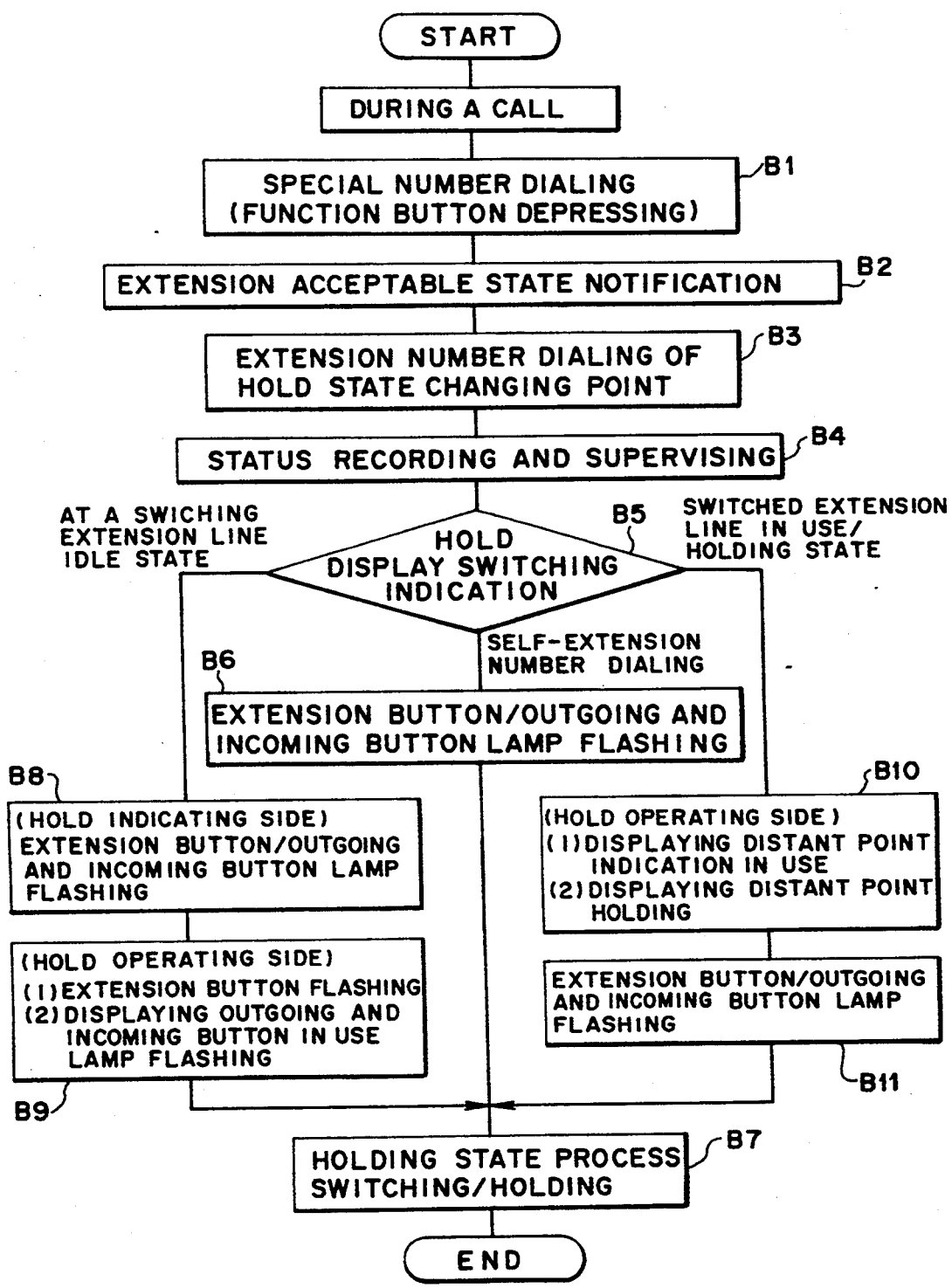
FIG. 6 is a flow chart showing the function of an embodiment of the present invention.

As shown with the time chart in FIG. 5 and the flowchart in FIG. 6, in order to forward a call during conversation through a multifunction telephone set 2 to another multifunction telephone set 2 on an extension or office line, the following process is performed.

When a hold display is provided on the multifunction telephone set 2 to which a hold display is forwarded on an extension or office line, the special number is first dialed by the multifunction telephone set 2 on the hold operation side (step A1 in FIG. 5 and step B1 in FIG. 6).

As a result, a hold display changing signal is sent together with hold information from multifunction telephone set 2 on the hold operation side to the exchange 3 (step A2 in FIG. 5). Then the exchange 3 executes the program process stored in the control memory 5a of the main memory 5'.

That is, the exchange 3 automatically stores the line for conversation of the multifunction telephone set 2 which have made a hold operation, to the talking circuit/hold display changing number memory 5b of the main memory 5' (step A3 in FIG. 5).

Thereafter, the exchange 3 transmits extension or office line acceptable state notification with respect to the multifunction telephone set 2 on the hold operation side (step A4 in FIG. 5 and step B2 in FIG. 6).

The multifunction telephone set 2 on the hold operating side which receives the notification displays a predetermined holding time on the display 4 thereof. After confirming the display, the operator dials a hold display changing extension number or hold display changing office line number (step A5 in FIG. 5 and step B3 in FIG. 6).

As a result, the exchange 3 automatically stores the dialed hold display changing extension number or hold display changing office line number to talking circuit/hold display changing number memory 5b. The exchange 3 starts to supervise the usage content of the extension or office line and the state of the talking button with the supervisory memory 5c of the main memory 5' (step A6 in FIG. 5 and step B4 in FIG. 6). Then the exchange 3 judges the state of the multifunction telephone set 2 to which a hold display is forwarded (step A6' in FIG. 5 and step B5 in FIG. 6).

The lamp 1 of the multifunction telephone set 2 to which a hold display is forwarded displays the hold display similar to that established through the hold operation of the multifunction telephone set 2 to which a hold display is forwarded.

That is, the lamp 1 arranged to the extension button 1.3 or outgoing/incoming button (office line button) of the multifunction telephone set 2 to which a hold display is forwarded (on the hold display side shown in FIG. 5) flashes in green (step A8 in FIG. 5 and step B8 in FIG. 6).

When the multifunction telephone set 2 on the hold operating side receives the hold state process switching display from the exchange 3 (step A9 in FIG. 5) and the forwarded distant point is an extension line, the lamp 1 of the extension button 1.3 thereof is dimmed. When the forwarded distant point is an office line, the outgoing and incoming button flashes in red to indicate that the hold operation has been transferred to the multifunction telephone set 2 to which the hold display is forwarded (step A10 in FIG. 5 and step B9 in FIG. 6).

When the multifunction telephone set 2 to which the hold display is forwarded is in a call state (refer to FIG. 5(B)), the exchange 3 sends notification (or hold display information) on the distant point in use to the multifunction telephone set 2 on the hold operation side (step A11 in FIG. 5). In addition, the exchange 3 indicates to the multifunction telephone set 2 on the hold operation side to maintain the hold state process (step A15 in FIG. 5).

In the multifunction telephone set 2 on the hold operation side, the lamp 1 of the extension button 1.3 or outgoing and incoming button flashes in green for an hold display (step A15' in FIG. 5 and step B11 in FIG. 6) while the display 4 displays that the distant point is in use (in blocking state on the distant point) (step A12 in FIG. 5 and step B10 in FIG. 6). When the multifunction telephone set 2 on the hold operation side remains its holding state for a predetermined period of time or more, an alarm tone is given to it.

If the multifunction telephone set 2 to which a hold display is forwarded is in a hold state (refer to FIG. 5(B)), the exchange 3 sends notification on the distant point in a hold state (or hold display information) to the multifunction telephone set 2 on the hold operating side (step A13 in FIG. 5). The exchange 3 indicates to the multifunction telephone set 2 on the hold indication side to maintain the hold state process (step A15 in FIG. 5).

Thus in multifunction telephone set 2 on the hold operationg side, the lamp 1 of the extension button 1.3 or outgoing/incoming button flashes in green for the hold display (step A15' in FIG. 5 and step B11 in FIG. 6) while the distant point hold display is provided on the display 4 (step A14 in FIG. 5 and step B10 in FIG. 6). In this case, when the multifunction telephone set 2 on the hold operation side remains its holding state over a predetermined period of time, an alarm tone is given to it.

In the above process, the hold display similar to that obtained during the hold operation of the multifunction telephone set 2 to which a hold display is forwarded is provided by the lamp 1 of a specific button in the function button pad 1' of the multifunction telephone set 2 to which a hold display is forwarded (step B7 in FIG. 6).

When an hold operator dials a self extension number erroneously (refer to step C in FIG. 5), the exchange 3 transmits an indication to maintain the hold state process to the multifunction telephone set 2 on the hold operating side (step A16 in FIG. 5).

The multifunction telephone set 2 on the hold operating side maintains the hold state process. As a result, the lamp 1 of the extension button or outgoing and incoming button flashes in green (step A17 in FIG. 5 and step B6 in FIG. 6).

This means that the hold display is held in the multifunction telephone set 2 on the hold operating side without being forwarded from the multifunction telephone set 2 on the hold operating side, thus corresponding to the case where the hold button of the multifunction telephone side 2 on the hold operating side is depressed (step B7 in FIG. 6).

If an hold operator dials a wrong number to the distant point, the display 4 on the hold operating side indicates an erroneous display, whereby the multifunction telephone set 2 on the self extension line displays the hold indication.

When the switching extension or office line is in idle, or in use or hold state and the self extension number is dialed, a call-back is provided to warn the responder against a long holding.

In the above embodiment, when a hold display is indicated on the multifunction telephone set 2 to which a hold display is forwarded, the special number of the multifunction telephone set 2 on the hold operating side is dialed. However, the special number may be registered by means of a specific abbreviated registration button 1.1.

Thus dialing merely a hold indication changing extension number enables the transfer operation of the hold display while a specific abbreviated registration button 1.1 is depressed.

The above operation can be made by depressing the repertory dial (free touch-tone dial) where the special number and the extension number for changing the hold display are registered.

The above structure includes plural multifunction telephone sets 2 each of which has a lamp 1 in a specific function button 1' and the exchange 3 accommodating the multifunction telephone sets 2. When information for the multifunction telephone set 2 to which a hold display is forwarded is sent from the multifunction telephone set 2 on the hold operating side, the exchange 3 sends the hold display switching information to the multifunction telephone set 2 to which a hold display is forwarded. Thus when the call is transferred to the telephone set 2 of a nearby person during talking through the extension button and the responder cannot respond immediately to the telephone call, the telephone relayed person can change the hold display by transferring the hold operation to the multifunction telephone set 2 to which the hold display is forwarded without waiting till the responder has his free hand, whereby the relayed person's job is not disturbed long by the telephone call.

When a response is made to the button holding call (on an office line), the responder can immediately recognize clearly the right button hold call without knowing the state of the multifunction telephone set 2 used by the hold operator. Therefore the quick process and reduced holding time lead to improved services to telephone users.

In both cases, since the right responder receives the call-back against a long holding state, he or she pays an attention to telephone responses without neglecting the hold call, whereby it is possible to give a quick response.

When the exchange 3 receives information for the multifunction telephone set 2 to which hold display is forwarded from the multifunction telephone set 2 on the hold operating side, it judges the state of the multifunction telephone set 2 to which the hold display is forwarded. If the multifunction telephone set 2 to which the hold display is forwarded is in an idle state, the hold display information is sent to it so that the multifunction telephone set 2 to which the hole display is forwarded executes the hold operation. If the multifunction telephone set 2 on the hold operating side is in a call or hold state, it receives the hold display information to provide the hold display on the multifunction telephone set 2 on the hold operating side. As described in the previous case, the hold operator can transfer certainly the hold call without interrupting his job. Moreover since the hold operator can recognize the current state of the multifunction telephone set 2 to which the hold display is forwarded, the hold operator can process in accordance with the state of the forwarded point.

When the multifunction telephone set 2 to which the hold display is forwarded is in a call or hold state, the exchange 3 sends hold display information and information on which the distant point is blocked, with respect to the multifunction telephone set 2 on the hold operating side so that the multifunction telephone set 2 on the hold operating side executes the hold display. The current state of the multifunction telephone set 2 to which the hold display is forwarded can be recognized more certainly by performing the distant point blocking display by the multifunction telephone set 2 on the hold operating side, whereby the hold operator can perform more properly the process in accordance with the state of the forwarded point.

The hold display on the multifunction telephone set 2 to which the hold display is forwarded is simply made by inputting the special number and the telephone number of the multifunction telephone set 2 on the hold operating side by means of the multifunction telephone set 2 on the hold operating side.

Moreover the hold display on the multifunction telephone set 2 to which the hold display is forwarded can be simply made by depressing the function button 1' and inputting the telephone number of the multifunction telephone set 2 to which a hold display is forwarded by means of the multifunction telephone set 2 on the hold operating side.

Hence even in the conventional networks, the hold display forwarding process can be merely performed by accommodating the program for processing hold display forwarding in the control memory 5a of the main memory 5' in the exchange 3.

Although a certain preferred embodiment of the present invention has been shown and described in detail, it should be understood that various changes and modufications may be made therein without departing from the scope of the apparent claims.

What is claimed is:

1. A method for displaying a hold service on a multifunction telephone set, comprising the steps of:

preparing a plurality of multifunction telephone sets each of which has a hold indicator, and an exchange accommodating said plurality of multifunction telephone sets, whereby when a holding operation of a multifunction telephone set is made during a call, said plurality of multifunction telephone sets and said exchange are cooperated with each other so as to provide a hold indication to the hold indicators of said multifunction telephone sets;

performing a holding operation of a multifunction telephone set on a hold operating side to send information for multifunction telephone sets to which a hold display is forwarded from a multifunction telephone set on said hold operating side to said exchange; and sending hold display switching information from said exchange to said multifunction telephone set to which said hold display is forwarded, wherein the hold indicator of said multifunction telephone set to which said hold display is forwarded indicates a hold display made by said multifunction telephone sets to which said hold display is forwarded.

2. A method for displaying a hold service for a multifunction telephone set according to claim 1, further comprising the steps of:

performing a hold operation of said multifunction telephone set to which a holding operation is made to send information for a forwarded multifunction telephone set from said multifunction telephone set on said hold operating side to said exchange;

judging a status of said multifunction telephone set to which a hold display is forwarded within said exchange; and sending said hold display switching information with respect to said forwarded multifunction telephone set by means of said exchange when said multifunction telephone set to which a hold display is forwarded is in an idle state, whereby a hold display made by said multifunction telephone set to which a hold display is forwarded is executed by said hold indicator of said multifunction telephone set to which said hold display is forwarded.

3. A method for displaying a hold service for a multifunction telephone set according to claim 2, wherein when said multifunction telephone set on hold operating side receives an extension call and said multifunction telephone set to which a hold indication is forwarded is in an idle state, said multifunction telephone set to which said hold indication is forwarded indicates its holding display while said multifunction telephone set on the hold operating side erases its holding display.

4. A method for displaying a hold service for a multifunction telephone set according to claim 2, wherein when said multifunction telephone set on hold operating side receives an office line call and said multifunction telephone set to which a hold display is forwarded is in an idle state, said multifunction telephone set to which said hold display is forwarded displays its holding state while it displays information that other multifunction telephone sets are in holding state, to said multifunction telephone set on the hold operating side.

5. A method for displaying a hold service for a multifunction telephone set according to claim 4, wherein said multifunction telephone set on the hold operating side displays its hold operating state in a different color from that of the hold display of said multifunction telephone set to which a hold display is forwarded.

6. A method for displaying a hold service for a multifunction telephone set according to claim 1, further comprising the steps of:
providing a holding operation of said multifunction telephone set to which a holding operation is made;
sending information for a multifunction telephone set to which a hold display is forwarded from said multifunction telephone set on said holding operation side to said exchange;
judging a status of said multifunction telephone set to which a hold display is forwarded within said exchange; and
sending said hold display information with respect to said multifunction telephone set on said hold operating side by means of said exchange when said multifunction telephone set to which a hold display is forwarded is in a busy or hold state, whereby a hold display is made on said hold indicator of said multifunction telephone set on said hold operating side.

7. A method for displaying a hold service for a multifunction telephone set according to claim 6, further comprising the steps of:
sending hold display information and distant blocking information with respect to said multifunction telephone set on said hold operating side by means of said exchange when said multifunction telephone set to which a hold display is forwarded is in a busy or hold state, to perform a hold display on said hold indicator of said multifunction telephone set on said hold operating side; and
displaying said distant blocking information on said indicator of said multifunction telephone set on said hold operating side.

8. A method for displaying a hold service for a multifunction telephone set according to claim 1, further comprising the step of inputting a special number as well as a telephone number of said multifunction telephone set to which a hold display is forwarded by means of said multifunction telephone set on said hold operating side when a hold display is performed on said multifunction telephone set to which said hold display is forwarded.

9. A method for displaying a hold service for a multifunction telephone set according to claim 1, further comprising the step of inputting a telephone number of said multifunction telephone set to which a hold display is forwarded by means of said multifunction telephone set on said hold operating side when a hold display is made on said multifunction telephone set to which said hold display is forwarded, in addition to an operation of a function button.

10. A method for displaying a hold service for a multifunction telephone set according to claim 1, wherein said information for said multifunction telephone set to which a hold display is forwarded is information on a telephone number of said multifunction telephone set to which a hold display is forwarded.

11. A hold service displaying device for a multifunction telephone set, and including plural multifunction telephone sets and an exchange accommodating said plural multifunction telephone sets, wherein said exchange and said plural multifunction telephone sets cooperate with each other so as to provide a hold display on a hold indicator of each of said multifunction telephone sets by executing a call holding operation during a calling period, the device comprising:
first memory means for storing exchange line information used by a multifunction telephone set on a hold operating side;
second memory means for storing information sent from said multifunction telephone set on said hold operating side, said information being used for a multifunction telephone set to which a hold display is forwarded;
supervisory means for supervising the status of a currently used line; and
control means for instructing a hold display switching information to said multifunction telephone set to which said hold display is forwarded when information for said multifunction telephone set to which said hold display is forwarded is sent from said multifunction telephone set on said hold operating side while the information contents of said first and second memory means are referred with a supervisory result from said supervisory means, said hold display switching information being information that said hold indicator of said multifunction telephone set to which said hold display is forwarded provides a hold display obtained according to a holding operation of said multifunction telephone set to which said hold display is forwarded.

12. A hold service displaying device suitable for a multifunction telephone set according to claim 11, wherein said information for said multifunction telephone set to which a hold display is forwarded is information on a telephone number of said multifunction telephone set to which a hold display is forwarded.

13. An exchange which accommodates plural multifunction telephone sets each provided with a hold indicating display, comprising:
first memory means for storing exchange line information used by a multifunction telephone set on a hold operating side;
second memory means for storing information sent from said multifunction telephone set on said hold operating side, said information being used for said multifunction telephone set to which a hold display is forwarded;
supervisory means for supervising the status of a currently used line; and
control means for instructing a hold display switching information to said multifunction telephone set to which said hold display is forwarded when information for said multifunction telephone set to which said hold display is forwarded is sent from said multifunction telephone set on said hold operating side while the information contents of said first and second memory means are referred with a supervisory result from said supervisory means, said hold display switching information being information that said hold indicating display of said multifunction telephone set to which said hold display is forwarded provides a hold display obtained according to a holding operation of said multifunction telephone set to which said hold display is forwarded.

14. The exchange according to claim 13, wherein said control means includes means for sending said hold display switching information to said multifunction telephone set to which a hold display is forwarded when said control means decides that said multifunction telephone set to which a hold display is forwarded is in an idle state by referring with a supervisory result in said supervisory means, in response to a hold operation information from said multifunction telephone set on said hold operating side and information sent from said multifunction telephone set on said hold operating side to said multifunction telephone set to which said hold display is forwarded.

15. The exchange according to claim 14, wherein said control means includes means for sending a signal to display that said multifunction telephone set to which said hold display is forwarded is in a holding state and for sending a signal to erase said hold display of said multifunction telephone set on said hold operating side, when said control means by referring a memory content in said second memory means with a supervisory result produced by said supervisory means decides that a call received by said multifunction telephone set on said hold operating side is an extension call and that said multifunction telephone set to which a hold display is forwarded is in an idle state.

16. The exchange according to claim 14, wherein said control means includes means for sending a signal to display that said multifunction telephone set to which said hold display is forwarded is in a holding state and for sending a signal to display that other multifunction telephone sets are in a hold state on said multifunction telephone set on said hold operating side, when said control means by referring a memory content in said second memory means with a supervisory result produced by said supervisory means decides that a call received by said multifunction telephone set on said hold operating side is an office line call and that said multifunction telephone set to which a hold display is forwarded is in an idle state.

17. The exchange according to claim 16, wherein said control means includes means for sending a signal to display information on said multifunction telephone set on said hold operating side, with a color different from that of said multifunction telephone set to which a hold display is forwarded.

18. The exchange according to claim 13, wherein said control means includes means for sending information regarding a hold display to said multifunction telephone set on said hold operating side when said control means decides that said multifunction telephone set to which said hold display is forwarded is in a busy or hold state by referring to a supervisory result obtained in said supervisory means, in response to a hold operation information from said multifunction telephone set on said hold operating side and information sent from said multifunction telephone set on said hold operating side to said multifunction telephone set to which said hold display is forwarded.

19. The exchange according to claim 18, wherein said control means includes means for sending both hold display information and distant blocking information to said multifunction telephone set on said hold operating side.

20. The exchange according to claim 13, wherein said information for said multifunction telephone set to which said hold display is forwarded comprises information regarding a telephone number of said multifunction telephone set to which said hold display is forwarded.

21. The exchange according to claim 13, wherein said information received from said multifunction telephone set on said hold operating side includes special number information and information regarding the telephone number of said multifunction telephone set to which said hold display is forwarded.

22. The exchange according to claim 13, wherein said information received from said multifunction telephone set on said hold operating side includes information regarding a function button operation of said multifunction telephone set on said hold operating side and information regarding a telephone number of said multifunction telephone set to which said hold display is forwarded.

* * * * *